Oct. 3, 1961 — F. M. BURHANS — 3,002,793
BEARING SUPPORT STRUCTURE
Filed May 7, 1958 — 3 Sheets-Sheet 1

F. M. BURHANS
INVENTOR.

BY
ATTORNEYS

F. M. BURHANS
INVENTOR.

United States Patent Office 3,002,793
Patented Oct. 3, 1961

3,002,793
BEARING SUPPORT STRUCTURE
Frank M. Burhans, Dearborn, Mich., assignor to Ford Motor Company, Dearborn, Mich., a corporation of Delaware
Filed May 7, 1958, Ser. No. 733,688
10 Claims. (Cl. 308—22)

This invention relates to a bearing support structure and more particularly to a bearing support structure for supporting a bearing or bearings of an elastic fluid power plant.

In many elastic fluid power plants the bearings for supporting the various shafts which carry the compressors and turbines must, of necessity, be supported in a region in which fluids of varying temperatures are flowing. The supporting structure must engage the casing of the power plant, must extend through this region where it is subjected to varying temperatures, and must then engage the bearing housing to support the bearing in a desired position within the casing.

The bearing support structure must therefore be capable of supporting the bearing and its associated structure in a desired position within the casing, and must be capable of maintaining this desired position through a wide range of temperatures without inducing high stresses in the various structural elements. While performing the above enumerated functions, the bearing support structure must be compact, relatively inexpensive and easy to assemble and adjust, particularly if it is to be employed in a mass produced fluid power plant such as an automotive gas turbine engine.

The present invention is particularly well suited for accomplishing the above enumerated objectives. It comprises a plurality of rods which engage the structure supporting the bearing and which extend tangentially therefrom to openings in the casing of the power plant. Each of the rods has a bearing surface which engages the casing and means are provided which engage the casing and a second bearing surface on each of said rods. When properly positioned, this means prevents the axial movement of the rods relative to the casing while simultaneously permitting rotation of the rods relative to the casing. The rods may be suitably prestressed in bending by rotating all of them through a selected angle. The structure surrounding the bearing, and the bearing, may then be positioned in proper alignment with respect to the casing by selective rotation of the various rods. When the desired position of the bearing has been obtained, the means engaging the casing and the second bearing surface of the rods may be tightened down against the second bearing surface to secure each of the rods against both axial and rotary motion in relation to the casing thus fixing the position of the bearings in relation to the casing.

Since the rods extend through a region where fluids may be flowing, for example, hot exhaust gas of the power plant, the rods will be subjected to considerable expansion and contraction. The rods will be much shorter, for example, when the power plant is not operating than when the engine has been running and exhaust gases in the neighborhood of 1000° F. have been flowing over the rods for a considerable length of time. When the power plant has reached operating temperature, the prestressing of the rods is relieved by the above mentioned thermal expansion. This differential expansion and contraction will tend to impart rotation to the structure supporting the bearing or bearings since the rods extend therefrom tangentially.

In the present invention, means are provided to permit rotation between that portion of the bearing support structure which engages the rods and that portion of the structure in which the bearing is supported. This takes up the differential expansion and contraction of the rods and prevents the rods from imparting a torque to that portion of the structure which is positioned immediately against the bearing or bearings, thus preventing undesirable stresses, deflections, or displacements in the structures.

An object of the present invention is the provision of a bearing support structure for supporting a bearing within a fluid power plant.

Another object of the present invention is the provision of a bearing support structure for supporting a bearing within a fluid power plant which is compact, relatively inexpensive and easy to assemble and adjust.

Another object of the present invention is the provision of a bearing support structure for a fluid power plant which is capable of accurately positioning a bearing assembly within the casing of the power plant and which is capable of maintaining the bearing structure within the casing in a desired position over a wide range of temperatures.

Another object of the present invention is the provision of a bearing support structure for supporting a bearing within a fluid power plant which is capable of accurately positioning a bearing assembly within the casing of the power plant and which is capable of maintaining the bearing structure within the casing in a desired position over a wide range of temperatures but which allows differential expansions in all directions without appreciable stressing of the support structure at the operating conditions of the power plant.

Another object of the present invention is the provision of a bearing support structure for supporting a bearing within a fluid power plant which is capable of accurately positioning a bearing assembly within the casing of the power plant and which is capable of maintaining the bearing structure within the casing over a wide range of temperatures allowing differential expansions in all directions and which can be adjusted so that the rods can be prestressed in bending at assembly in such a way that the thermal expansion of the rods will reduce the stresses thus reducing the differential expansion stress to a minimum at the operating conditions of the power plant.

Other objects and attendant advantages of the present invention will become more readily apparent as the specification is considered in connection with the accompanying drawings in which.

Figure 1:
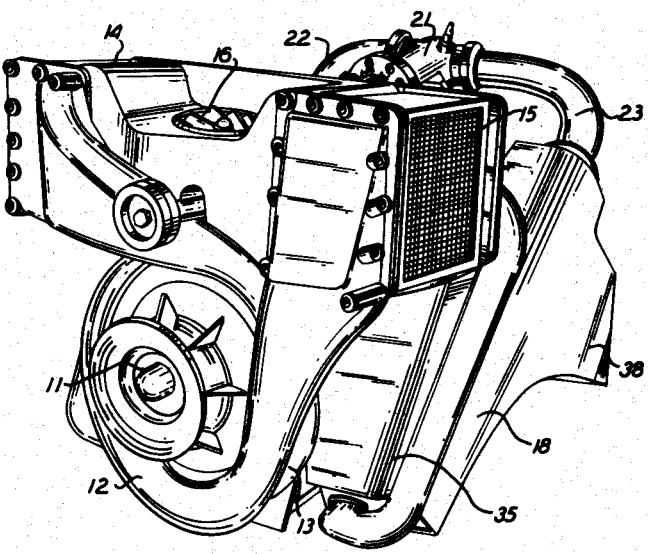
FIGURE 1 is a perspective view of a gas turbine power plant employing the bearing support structure of the present invention.
Figure 2:
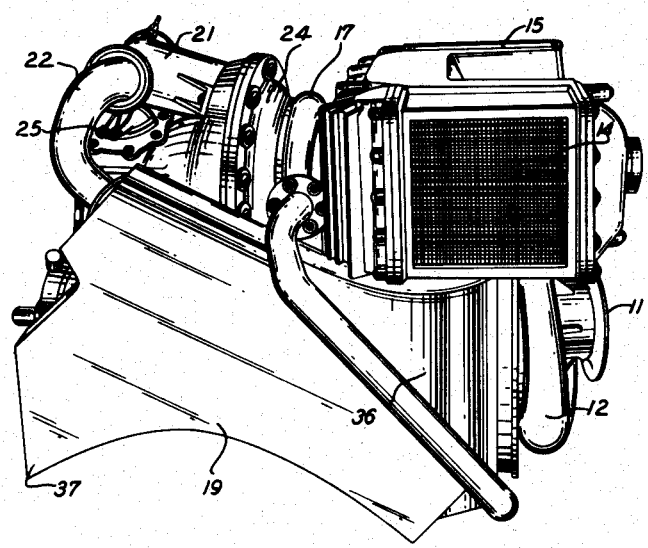
FIGURE 2 is a side elevational view of the gas turbine power plant of FIGURE 1.

Referring now to the drawings in which like reference numerals designate like parts throughout the several views thereof, there is shown in FIGURES 1 and 2 an elastic fluid power plant, which may conveniently employ the present invention. A low pressure compressor 11 is provided where air is taken into the power plant and compressed. Scrolls 12 and 13 receive the compressed air from the compressor 11, and introduce it into the intercoolers 14 and 15 where it is cooled by means of a fan 16 which delivers cooling air outwardly from the center of the power plant through the intercooler structures. From the intercoolers the cooled air is fed to a second or high pressure compressor, the outer casing of which is shown at 17, where it is further compressed and fed to heat exchangers 18 and 19 located on each side of the engine. The heated air is then passed through conduits 22 and 23 into a first burner 21 where heat is added. The effluent from the burner is fed to a high pressure turbine, the external portion of which is shown at 24, which drives the high pressure compressor. From the high pressure turbine, the fluid is fed to a second burner 25 where it is further heated before being fed to a power turbine 26 through scroll 27 and inlet nozzle 28 (see FIGURE 3). The fluid then passes through a two stage low pressure turbine assembly comprising a pair of turbines 31 and 32 with an interstage nozzle 33 positioned therebetween. The exhaust gases from the low pressure turbine pass into a diffuser generally designated by the numeral 34 and thence to the heat exchangers 18 and 19 by means of suitable ducting 35 and 36 (see FIGURES 1 and 2). After heating the air delivered by the second or high pressure compressor, the exhaust gases pass to the atmosphere through ducts 37 and 38.

Figure 3:
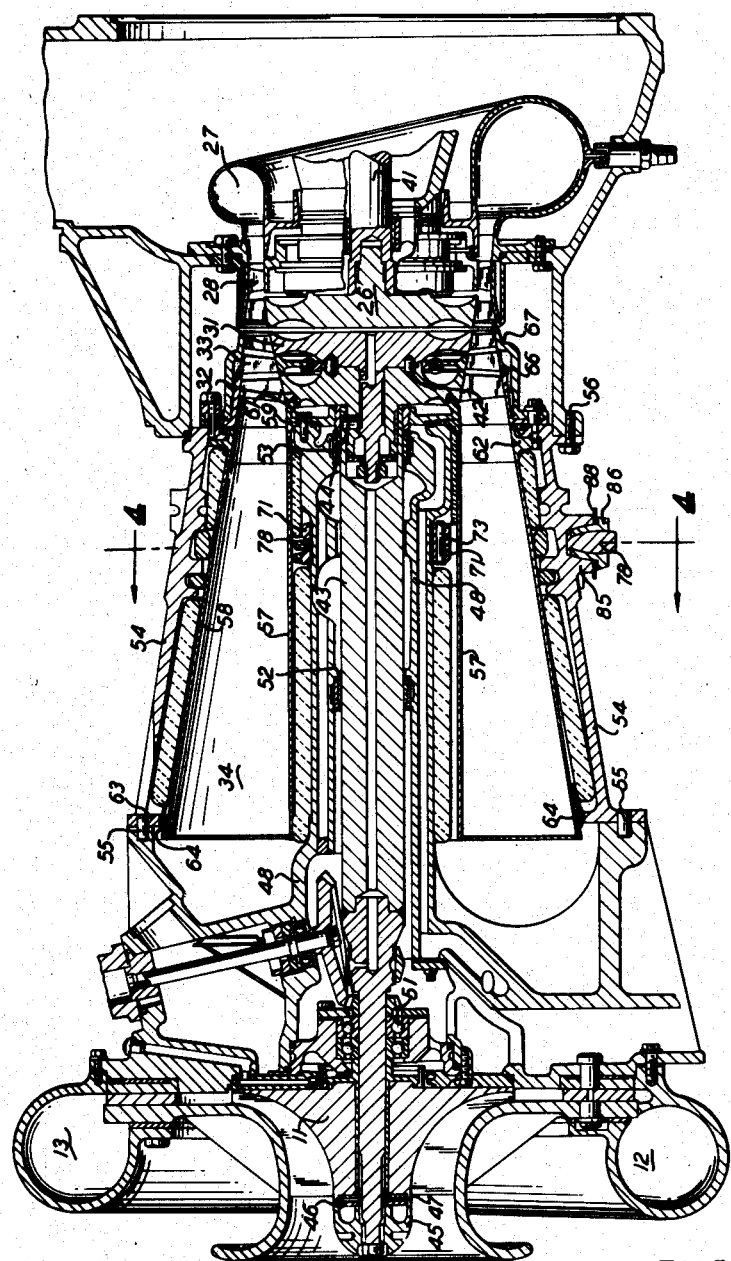
FIGURE 3 is a longitudinal sectional view of the low pressure spool and power turbine of the gas turbine power plant of FIGURES 1 and 2.

Referring now to FIGURE 3, it can be seen that the power turbine is connected to an output shaft 41 which may be connected through suitable gearing (not shown) to drive an external load (not shown). The two low pressure turbines are suitably connected together by pins as shown at 42 and to a shaft 43 by means of a pin as shown at 44. The low pressure compressor 11 is secured to the other end of the shaft 43 by means of a suitable nut 45 and interposed washer elements 46 and 47 so that the low pressure turbines may drive the low pressure compressor in a suitable manner. The low pressure turbines, the low pressure compressor, and the interconnecting shaft make up an assembly conventionally known as a low pressure spool.

The shaft 43 is suitably supported in a housing 48 by means of a bearing assembly 51 positioned near the compressor 11 and a pair of sleeve bearings 52 and 53 positioned near the mid-point of the housing and near the turbine end of the housing respectively. Surrounding in spaced relationship that portion of the shaft and the housing which contain the bearings 52 and 53 is a casing 54 which is located and secured to the housing 48 by means of dowels and bolts as at 55 and to the turbine casing by suitable means as shown at 56.

The sheet metal diffuser 34 comprises an inner portion 57 which surrounds a portion of the housing 48 as shown in FIGURE 3, and an outer portion 58 which is positioned around the inner diameter of the casing 54. The inner portion 57 may be conveniently welded to an annular flanged member 59 which is suitably secured against the housing 48 as shown at 61. The outer portion may be welded to an annular flanged member 62 which is suitably secured against the casing by any conventional means and is free to slide through an inwardly projecting flange 63 of casing 54 as shown at 64. Suitable insulating material is positioned between the outer portion 58 of the diffuser and the casing 54 and between the inner portion 57 of the diffuser and the housing 48 to suitably insulate the bearings 52 and 53, the shaft 43, the housing 48 and any enclosed lubricant, and the casing 54 from the high temperatures of the exhaust gases present in the diffuser.

The gas turbine engine shown in FIGS. 1 through 3 and described above forms no part of the present invention. It is the invention of Benjamin T. Howes and Ivan M. Swatman and is described and claimed in copending application S.N. 19,797 filed April 4, 1960 entitled Gas Turbine Engine that is assigned to the assignee of the present invention.

It is apparent from an inspection of FIGURE 3 that the portion of the housing 48 which contains the bearings 52 and 53 and which supports the shaft 43 and turbines 31 and 32 is spaced a considerable distance axially from the point where the casing 54 and the housing 48 are joined at 55. This necessitates a structure for supporting the weight of the housing, the shaft, and the turbines, and for resisting the dynamic loads caused by the high speed rotation of the turbines and shaft to keep the bearings 52 and 53, the shaft 43, and the low pressure turbines 31 and 32 properly aligned with respect to the casing 54 and the turbine shrouds 66 and 67.

Figure 4:
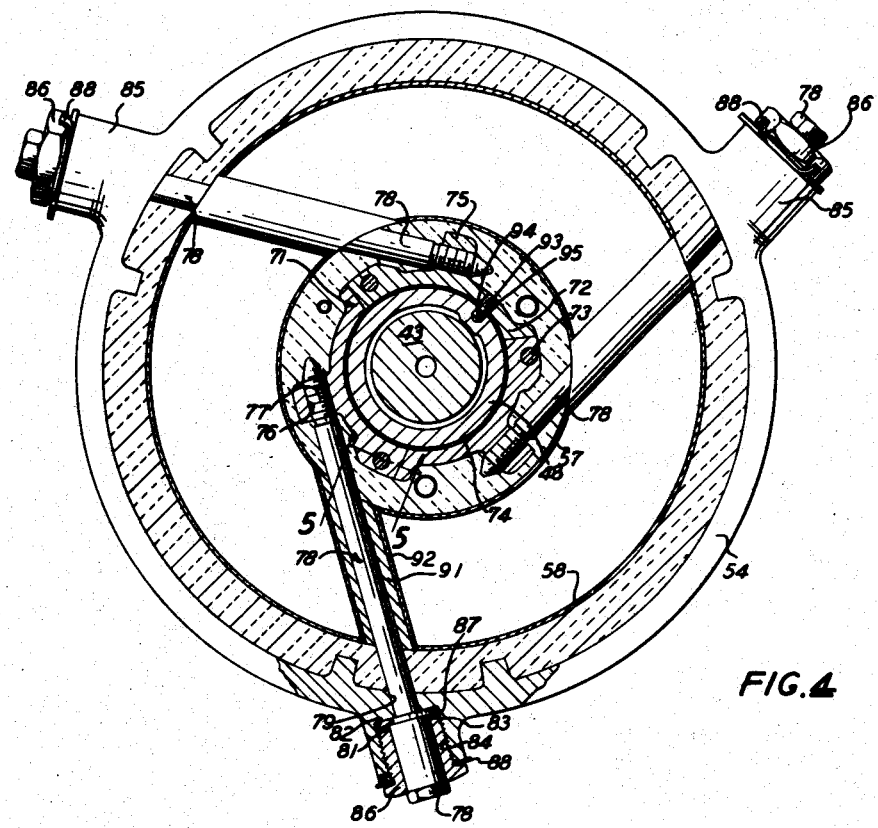
FIGURE 4 is a cross sectional view of the bearing support structure taken along line 4—4 of FIGURE 3 with some of the parts shown in elevation; and, FIGURE 5 is a cross sectional view taken along the lines 5—5 of FIGURE 4.

The structure for so supporting the housing, bearings, shaft and turbine can best be understood by reference to FIGURE 4 which shows a ring generally designated by the numeral 71 surrounding the housing 48. This ring may be formed in a plurality of segments 72 as shown so that it may be properly assembled on the housing 48. In some applications, of course, where it is possible to slide the completed ring over the end of the housing, the ring may conveniently be formed of a single piece. In this instance, however, the diameter of the end of the housing 48 is larger than the internal diameter of the ring and it may be conveniently formed of three segments. The segments are joined together external of the power plant, the internal diameter machined to size, the segments disassembled and then reassembled on the housing 48. A wear band 74 may be positioned over the housing 48 and enough clearance provided between the wear band and the internal diameter of the ring to permit the ring to rotate upon the wear band under all temperature conditions. Of course, if the housing 48 is constructed of a material having a hard surface, the wear band would not be required.

Each of the segments 72 has an upstanding boss 75 internally threaded as at 76 to receive a threaded portion 77 of a support rod 78. The support rods extend outwardly from the ring 71 in a tangential relationship and are piloted in the casing 54 as shown at 79. Each support rod has an annular flange 81 extending therefrom to form two bearing surfaces 82 and 83, one of which engages the bottom of a threaded bore 84 positioned in upstanding boss 85 formed on the casing 54. A nut 86 is threaded into the bore 84, and may be brought into engagement with the second bearing surface on the flange 81 through a washer 87. The nuts 86 may be conveniently locked into position by means of lock washers 88.

The rods 78 extend through both the inner portion 57 and the outer portion 58 of the diffuser 34 and are enclosed by a jacket of insulating material 91 with a metal covering 92. The metal covering 92 may be suitably affixed to the inner portion 57 and the outer portion 58 of the diffuser by any suitable method, for example, welding.

Figure 5:
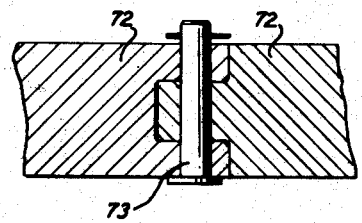

Although the invention is not limited thereto, the following assembly and adjustment procedure is preferred to give optimum results. Furthermore, the direction of rotation of the rods is given by way of illustration only, assuming that conventional right had threads are employed. The segments 72 of the ring are placed over the housing 48 and wear band 74, and pinned together by means of pins 73 through tongue and groove joints as shown in FIGURE 5. The diffuser 34 with the inner portion 57 and 58, the insulating material and the jacket 91 of insulating material with metal covering 92 may then be properly placed in position. To prevent undue rotation of the ring during these assembly operations, a pin 93 is positioned in bore 94 in the housing and extends outwardly through a closely controlled larger bore 95 in a segment 72 of the ring 71. This pin and hole relationship prevents undue rotation of the ring 71 during assembly so that the rods 78 may be readily threaded into the ring, permits enough rotation between the ring and the housing to compensate for any thermal expansion or contraction of the rods and gives a reference figure at assembly but prevents over stressing of the rods due to careless assembly.

One of the rods 78 is placed in position with the threaded portion 77 being threaded into the internally threaded portion 76 of the boss 75 and with the bearing surface 82 of the flange 81 engaging the bottom of the threaded bore 84. The rod is then turned clockwise to rotate the ring 71 until the pin 93 engages one side of the bore 95 positioned in a segment 72 of the ring 71. The lock nut 86 is then positioned in the bore 84 and turned down against the bearing surface 83 of the flange 81 and the washer 87 so that axial movement of the rod with respect to the casing is substantially prevented. The rod is then backed down, turned counterclockwise, to rotate the ring 71 so that the pin 93 is centralized in the bore 95, and so that the axis of the rod 78 is aligned with the axis of the threaded bore 76. The other two rods 78 are then threaded into the ring 71 with the bearing surfaces 82 of the flanges 81 engaging the bottoms of the bores 84 and the lock nuts 86 are positioned and turned down against the bearing surfaces 83 and washers 87 so that axial movement of the rods with respect to the casing is substantially prevented. All of the rods are then turned clockwise through a selected angle or number of turns, for example, 165°, to rotate the ring 71 so that the axes of the threaded bores 76 in the bosses 75 are no longer aligned with the axes of the rods. This causes a prestress in bending to be set up which is relieved when the power plant is brought up to operating temperature. The rods may then be rotated selectively to properly position bearings 52 and 53 and the shaft 43 with respect to the casing 54 and to properly position the turbines 31 and 32 within the shrouds 66 and 67. The various components of the power plant may be suitably machined and an adjusting mechanism may be provided for the shrouds 66 and 67 so that rods 78 need be rotated only a small amount to properly position the bearings, the shaft, and the turbines within the casing and the shrouds. For example, if the rods are to be prestressed by rotation through 165°, the rotation of any one rod for positioning purposes may be limited to 50°.

After the adjusting procedure has been accomplished, the nuts 86 are securely tightened down against the bearing surface 83 on the flange 81 of the rods to prevent rotation of the rods in relation to the casing 54. The tabs on lock washers 88 are then properly set to lock the rods and the nuts in position.

When the power plant in which this bearing support structure is employed is brought up to operating temperature, the support rods expand to a considerable degree. Since the rods are connected in substantially a tangential relationship to the ring 71 which is free to rotate with respect to the housing 48, the net effect of the expansion is a rotation of the ring with respect to the housing in a direction opposite to that caused by the clockwise rotation of the rods during the prestressing operation. The rotation of the ring in this direction brings the axes of the threaded bores 76 substantially into alignment with the axes of the rods 78 thus substantially relieving the bending stress in the rods which was set up during assembly. Of course, the amount of the prestress can be carefully controlled so that at normal operating temperatures the stress, caused by thermal conditions and static loading, will be nearly zero, plus or minus the stress placed in the rods during the adjustment of the bearings, shaft, and turbines into their proper position in the casing and shrouds. Thus, at operating conditions the alignment of the bearings 52 and 53 and the shaft 43 with respect to the casing and the alignment of the turbines 31 and 32 with respect to the turbine shrouds 66 and 67 remains undisturbed and simultaneously the bending prestress in the rods is substantially relieved allowing the rods to approach a stressless state. It can also be readily understood by reference to FIGURES 3 and 4 that the ring 71 is free to move axially on the wear band 74 and the housing 48, thus permitting differential thermal expansion of the housing relative to the casing in an axial direction.

It should be noted from the above discussion that the rods carry virtually no stress except from dynamic loading in the operating condition as the bending stress in the rods due to the rotation of the ring can be adjusted by a controlled assembly procedure so that the stress is relieved when the rod changes length during operating conditions. Furthermore, since the ring is free to rotate on the wear band and housing, the only compressive or tensile stresses other than from dynamic loading, are those caused by the selective rotation of the rods in properly positioning the bearings, shaft, and turbines within the casing and the turbine shrouds.

It can also be appreciated that considerable saving in manufacturing costs can be realized when the present invention is employed to properly align the bearings, shaft, and turbine, as machining tolerances relating to bearing, shaft, and turbine alignment can be relaxed considerably. Any bearing misalignment can be compensated for by proper adjustment of the support rods. Furthermore, by properly prestressing the rods, their size may be reduced which accomplishes not only a saving of material, but results in less obstruction to the flow of fluids in the diffuser between the housing and the casing thus increasing the efficiency of the power plant.

It will be understood that the invention is not to be limited to the exact construction shown and described, but that various changes and modifications may be made without departing from the spirit and scope of the invention, as defined in the appended claims.

What is claimed is:

1. A bearing support structure comprising, a casing, a housing positioned within said casing for supporting a bearing, a ring positioned about said housing, a plurality of rods operatively engaging said ring and extending through said casing, a flange positioned on each of said rods engaging said casing on one side thereof, means engaging said casing and the other side of the flange of each rod so that said rods are rotatable with respect to said casing and so that axial movement of said rods with respect to said casing is substantially prevented, whereby said housing and said bearing may be adjusted to a desired position within said casing upon rotation of said rods.

2. A bearing support structure comprising a casing, a housing positioned within said casing for supporting a bearing, a ring positioned about said housing, a plurality of rods threadingly engaging said ring and extending through said casing, a flange positioned on each of said rods engaging said casing on one side thereof, means engaging said casing and the other side of the flange of each of said rods so that said rods are rotatable with respect to said casing and so that axial movement of said rods with respect to said casing is substantially prevented whereby said housing and said bearing may be adjusted to a desired position within said casing upon rotation of said rods, said means engaging said casing and the flange of each of said rods being capable of movement to firmly lock said rods against rotation with respect to said casing.

3. A structure for supporting a bearing comprising, a casing, a housing positioned within said casing for supporting the bearing, a ring positioned in a sliding fit over said housing, a plurality of rods operatively engaging said ring and extending tangentially therefrom through said casing, each of said rods having a flange extending therefrom, said casing having upstanding bosses positioned where said rods extend through said casing, each of said bosses having an internal bore positioned therein, the flanges on said rods engaging the bottoms of the internal bores of said bosses, and a lock nut positioned in the internal bore of each of said bosses for engaging the flanges on said rods.

4. A structure for supporting a bearing comprising, a casing, a housing positioned within said casing for supporting the bearing, a ring positioned in a sliding fit over said housing, a plurality of rods operatively engaging said ring and extending tangentially therefrom through said casing, means including, a portion of said casing and means engaging said casing and each of said rods, for substantially preventing the axial movement of said rods both toward and away from said bearing and permitting said rods to be rotated, whereby said housing and said bearing may be adjusted to a desired position within said casing upon rotation of said rods.

5. A support assembly comprising, a casing, a bearing positioned within said casing, bearing support means supporting said bearing, a plurality of rods operatively engaging said bearing support means and extending tangentially therefrom through said casing, means on each of said rods engaging said casing, and means engaging said casing and the means on each of said rods for substantially preventing the axial movement of said rods both toward and away from said bearing and permitting said rods to be rotated whereby said bearing support means and said bearing may be adjusted to a desired position within said casing upon rotation of said rods.

6. A support assembly for a bearing comprising, a casing, a bearing positioned in said casing, a housing positioned around said bearing, a band positioned around said housing, a ring positioned over said band in a sliding fit relationship, three support rods threadingly engaging said ring and extending tangentially therefrom, through said casing, each of said rods having a first bearing surface for engagement with said casing, each of said rods having a second bearing surface, adjustable means engaging said casing and the second bearing surface on each of said rods for substantially preventing the axial movement of said rods with respect to said casing and for permitting rotation of said rods with respect to said casing whereby said bearing may be adjusted to a desired position within said casing upon rotation of said rods, said adjustable means capable of being tightened against the second bearing surfaces of said rods to fix said rods in said casing both axially and rotationally, and to fix the bearing in said desired position within said casing.

7. A support assembly for a bearing comprising, a casing, a bearing positioned within said casing, bearing support means supporting said bearing, a plurality of support rods threadingly engaging said bearing support means and extending tangentially therefrom, a plurality of apertures positioned in said casing for receiving said support rods, each of said rods having a first bearing surface engaging said casing, each of said rods having a second bearing surface, means engaging said casing and being positioned against the second bearing surface on each of said support rods for substantially preventing the axial movement of said rods with respect to said casing and for permitting rotational movement of said support rods with respect to said casing whereby said bearing may be adjusted to a desired position within said casing upon rotation of said rods.

8. A bearing support assembly comprising a casing, a bearing positioned within said casing, bearing support means supporting said bearing, a plurality of rods operatively engaging said bearing support means and extending tangentially therefrom through said casing, and means associated with said casing for substantially preventing the axial movement of said rods in both axial directions and for permitting said rods to be rotated, whereby said bearing support means and said bearing may be properly positioned within said casing and said rods may be prestressed by selectively rotating said rods.

9. A bearing support structure comprising a bearing, first means positioned about the outer periphery of said bearing, second means positioned over said first means, and engaging said first means in a sliding fit relationship, a plurality of rods operatively engaging said second means and extending tangentially therefrom through said casing, and means associated with said casing for substantially preventing the axial movement of said rods in both axial directions and for permitting said rods to be rotated whereby said first means and said bearing may be properly positioned within said casing by selectively rotating said rods.

10. A bearing support structure comprising a bearing, a casing means positioned about the outer periphery of said bearing, a plurality of rods threadingly engaging said means and extending tangentially therefrom through said casing, and means associated with said casing for substantially preventing the axial movement of said rods in both axial directions and for permitting said rods to be rotated whereby said bearing may be properly positioned within said casing.

References Cited in the file of this patent

UNITED STATES PATENTS

| | | |
|---|---|---|
| 1,900,128 | Persons | Mar. 7, 1933 |
| 2,447,852 | Gartin | Aug. 24, 1948 |
| 2,616,662 | Mierley | Nov. 4, 1952 |
| 2,724,621 | Kenney | Nov. 22, 1955 |
| 2,928,648 | Haines et al. | Mar. 15, 1960 |